(12) United States Patent
Kim et al.

(10) Patent No.: US 9,549,336 B2
(45) Date of Patent: Jan. 17, 2017

(54) METHOD FOR OBTAINING POLICY INFORMATION FOR MAKING TRAFFIC DETOUR

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 14/403,895

(22) PCT Filed: May 30, 2013

(86) PCT No.: PCT/KR2013/004741
§ 371 (c)(1),
(2) Date: Nov. 25, 2014

(87) PCT Pub. No.: WO2013/180477
PCT Pub. Date: Dec. 5, 2013

(65) Prior Publication Data
US 2015/0148033 A1    May 28, 2015

Related U.S. Application Data

(60) Provisional application No. 61/654,041, filed on May 31, 2012, provisional application No. 61/817,881, filed on May 1, 2013.

(51) Int. Cl.
H04W 4/00 (2009.01)
H04W 28/02 (2009.01)
(Continued)

(52) U.S. Cl.
CPC ......... *H04W 28/0215* (2013.01); *H04W 8/183* (2013.01); *H04W 36/22* (2013.01);
(Continued)

(58) Field of Classification Search
CPC .. H04W 28/0215; H04W 8/183; H04W 36/22; H04W 36/38; H04W 48/16; H04W 48/14; H04W 28/0205; H04W 8/24; H04W 28/08; H04W 84/045; H04W 48/18
(Continued)

(56) References Cited

U.S. PATENT DOCUMENTS

2008/0039102 A1* 2/2008 Sewall ............... H04L 12/2856
455/445
2012/0036271 A1 2/2012 Patil et al.
(Continued)

FOREIGN PATENT DOCUMENTS

KR  10-2012-0001343 A  1/2012
WO  WO 2012/035203 A1  3/2012

OTHER PUBLICATIONS

3GPP TSG SA WG2 Meeting #91, TD S2-122190, "Key Issues for WLAN_NDS", Intel, Agenda Item: 8.6, pp. 1-3, May 21-25, 2012, Kyoto, Japan.
(Continued)

*Primary Examiner* — Marcos Batista
(74) *Attorney, Agent, or Firm* — Birch, Stewart, Kolasch & Birch, LLP

(57) ABSTRACT

The present invention provides a method for user equipment obtaining policy information for making a traffic detour. The method for obtaining the policy information may comprise a step of the user equipment receiving via an access point (AP), policy information related to Hotspot 2.0, wherein the policy information related to the Hotspot 2.0 may include policy information related to a roaming consortium estab-
(Continued)

lished between AP enterprises. The method for obtaining the policy information may further comprise a step of transmitting to a 3GPP-based network node a policy information request message including the policy information related to the Hotspot 2.0 that is received, in order to obtain 3GPP-based policy information that reflects the policy information related to the Hotspot 2.0 that is received.

14 Claims, 14 Drawing Sheets

(51) Int. Cl.
*H04W 48/14* (2009.01)
*H04W 36/22* (2009.01)
*H04W 36/38* (2009.01)
*H04W 48/16* (2009.01)
*H04W 8/18* (2009.01)
*H04W 48/18* (2009.01)
*H04W 28/08* (2009.01)
*H04W 84/04* (2009.01)
*H04W 8/24* (2009.01)

(52) U.S. Cl.
CPC ........... *H04W 36/38* (2013.01); *H04W 48/14* (2013.01); *H04W 48/16* (2013.01); *H04W 8/24* (2013.01); *H04W 28/0205* (2013.01); *H04W 28/08* (2013.01); *H04W 48/18* (2013.01); *H04W 84/045* (2013.01)

(58) Field of Classification Search
USPC ........................................ 455/432.3; 370/338
See application file for complete search history.

(56) References Cited

U.S. PATENT DOCUMENTS

| | | |
|---|---|---|
| 2012/0071165 A1 | 3/2012 | Pampu et al. |
| 2012/0196644 A1 | 8/2012 | Scherzer et al. |
| 2012/0324100 A1 | 12/2012 | Tomici et al. |
| 2013/0070738 A1* | 3/2013 | McCann ............... H04W 48/14 370/338 |

OTHER PUBLICATIONS

SA WG2 Meeting #91, S2-122300, "The architecture and the high level requirement", China Mobile, Agenda Item: WLAN Network Selection for 3GPP Terminals, pp. 1-3, May 21-25, 2012, Kyoto, Japan.

* cited by examiner

METHOD FOR OBTAINING POLICY INFORMATION FOR MAKING TRAFFIC DETOUR

CROSS REFERENCE TO RELATED APPLICATIONS

This application is the National Phase of PCT International Application No. PCT/KR2013/004741, filed on May 30, 2013, which claims priority under 35 U.S.C. 119(e) to U.S. Provisional Application Nos. 61/654,041, filed on May 31, 2012 and 61/817,881, filed on May 1, 2013, all of which are hereby expressly incorporated by reference into the present application.

BACKGROUND OF THE INVENTION

Field of the Invention

The present invention relates to a method for obtaining policy information for traffic offload.

Related Art

In 3GPP for regulating the technical standards of the $3^{rd}$ mobile communication system, from the end of the year 2004, there have been started researches on Long Term Evolution/System Architecture Evolution (LTE/SAE) technology as part of an effort to optimize and improve the performance of 3GPP technologies in order to handle several forums and new technologies related to a $4^{th}$ mobile communication.

SAE that has been in progress based on 3GPP SA WG2 is research regarding a network technology for the purposes of determining the configuration of a network and supporting mobility between heterogeneous networks along with the LTE task of a 3GPP TSG RAN, and SAE is one of the recent important standardization issues of 3GPP. In SAE, a task has been in progress for the purposes of an optimized packet-based system with minimized transmission delay through a further improved data transfer capability as a task for developing a 3GPP system into a system that supports various radio access technologies based on an IP.

An SAE higher level reference model defined in 3GPP SA WG2 includes non-roaming cases and roaming cases including various scenarios. For the detailed contents of the SAE higher level reference model, reference may be made to 3GPP standard document TS 23.401 and TS 23.402. A simple reconfiguration of the SAE higher level reference model is illustrated in a network configuration of FIG. 1.

FIG. 1 illustrates the configuration of an evolved mobile communication network.

One of the greatest characteristics of the network configuration of FIG. 1 is that the network configuration is based on the eNodeB of an evolved UTRAN and the 2 tier model of a gateway of a core network. An eNodeB 20 includes the functions of the NodeB and RNC of an existing UMTS system although they are not precisely matched, and the gateway may be considered to have the SGSN/GGSN functions of the existing system.

Another important characteristic is that a control plane and a user plane between an access network and a core network are exchanged through different interfaces. In an existing UMTS system, one Iu interface was present between an RNC and an SGSN. In contrast, in this network configuration, a Mobility Management Entity (MME) 51 responsible for the processing of control signals is configured to be separated from a gateway (GW), and thus two interfaces S1-MME and S1-U are individually used. The GW includes a Serving-GW (hereinafter referred to as an 'S-GW') 52 and a Packet Data Network GW (hereinafter referred to as a 'PDN-GW' or a 'P-GW') 53.

FIG. 2 is a diagram illustrating a relationship between an (e)NodeB and a Home (e)NodeB.

In the $3^{rd}$ or $4^{th}$ mobile communication system, attempts to increase a cell capacity continue to be made in order to support high-capacity services and bidirectional services, such as multimedia content and streaming.

That is, as various high-capacity transmission technologies are required in line with the development of communication and the spread of multimedia technologies, there is a method of allocating more frequency resources as a method of increasing a radio capacity, but to allocate more frequency resources to a plurality of users using limited frequency resources is limited.

In order to increase the cell capacity, there has been an approach for using a higher frequency band and reducing cell coverage. If a cell having small cell coverage, such as a pico cell, is used, there is an advantage in that more information may be transferred because a band higher than a frequency used in an existing cellular systems may be used. However, there is a disadvantage in that expenses are increased because more base stations must be installed in the same area.

Approaches for increasing the cell capacity using a small cell as described above include a femto base station, such as a Home (e)NodeB 30 that has recently been proposed.

An (e)NodeB 20 illustrated in FIG. 2 may correspond to a macro base station, and the Home (e)NodeB 30 illustrated in FIG. 2 may become a femto base station. This specification is described based on the terms of 3GPP, and an (e)NodeB is used to denote a NodeB or an eNodeB. Furthermore, a Home (e)NodeB is used to denote both a Home NodeB and a Home eNodeB.

Interfaces indicated by dotted lines are for transmitting control signals between the (e)NodeB 20 and the Home (e)NodeB 30, and the MME 510. Furthermore, interfaces indicated by solid lines are for transmitting the data of a user plane.

FIG. 3 illustrates conventional problems.

As illustrated in FIG. 3, if traffic is overloaded or congested in the interface between the (e)NodeB 20 and an S-GW 52 or traffic is overloaded or congested in the interface between the Home (e)NodeB 30 and the S-GW 52, downlink data toward UE 10 or upload data from the UE 10 is not correctly transmitted, thus resulting in a failure.

Alternatively, if the interface between the S-GW 52 and a PDN-GW 53 or the interface between the PDN-GW 53 and an Internet Protocol (IP) service network of a mobile communication service provider is overloaded or congested, downlink data toward the UE 10 or upload data from the UE 10 is not correctly transmitted, thus resulting in a failure.

Furthermore, there is a problem in that the service of the UE is dropped if another cell has been overloaded when the UE performs a handover from a current cell from which the UE is supplied with the service to another cell.

In order to solve the problems, mobile communication service providers have changed the S-GW 52 and the PDN-GW 53 into an S-GW and PDN-GW of a higher capacity or have increased new equipment. However, there is a disadvantage in that high expenses are required. Furthermore, there is a disadvantage in that the S-GW and the PDN-GW of a higher capacity or the new equipment is shortly overloaded because the amount of transmitted and received data is increased by geometrical progression.

Meanwhile, there have been proposed various schemes for optimizing the S-GW 52 and the PDN-GW 53 without increasing a mobile communication network as described above. For example, there has been proposed a technology in which in a macro access network, specific IP traffic (e.g., Internet service) of UE is transmitted through a selected optimum path, and in a femto access network (e.g., a Home (e)NB), the specific IP traffic is offloaded to a path through the nodes of a public network, that is, a wired network, not a mobile communication network without transmitting and receiving the specific IP traffic to and from a path through a mobile communication network.

FIG. 4 illustrates a concept of Selected IP Traffic Offload (SIPTO).

FIG. 4 is an exemplary diagram illustrating a mobile communication system, such as an Evolved Packet System (EPS). The EPS system includes an (e)NodeB 20, an MME 51, an S-GW 52, and a P-GW 53. Furthermore, a Home (e)NodeB 30 is illustrated.

As illustrated, in the Selected IP Traffic Offload (SIPTO) technology, specific IP traffic (e.g., Internet service) of UE 10 is offloaded to the nodes of a wired network 70 without passing through nodes within the IP service network 60 of a mobile communication service provider.

For example, if UE 10 receives a grant to access the (e)NodeB 20 or the Home (e)NodeB 30, the UE 10 may generate a session via the wired network 70, such as a public communication network, through the (e)NodeB 20 or the Home (e)NodeB 30 and perform IP network service through the session. In this case, a service provider policy and subscription information may be taken into consideration.

In order for the session to be generated as described above, a gateway installed at a location close to the (e)NodeB 20 or the Home (e)NodeB 30 may be used as a gateway, that is, a local gateway responsible for some of the functions of a GGSN in the case of an UMTS or a local gateway responsible for some of the functions of a PDN Gateway (P-GW) in the case of an EPS.

Such a local gateway is called a local GGSN or a local P-GW. The function of the local GGSN or local P-GW is similar to that of a GGSN or P-GW.

As described above, the SIPTO technology has proposed a concept in which the data of UE is offloaded to a wired network, such as a public communication network, through the (e)NodeB 20 or the Home (e)NodeB 30.

SUMMARY OF THE INVENTION

As described above, a conventional technology has proposed a concept for offloading the data of UE to a wired network according to a policy of a service provider.

As the type of service provider policy is diversified, however, there is a problem in that it is unclear whether UE has to use what policy.

To achieve the objection, according to the one embodiment of the present specification, there is provided a method for obtaining policy information for traffic offload. The method may be performed by user equipment and comprise: receiving, by the user equipment, HotSpot 2.0-related policy information through an Access Point (AP), wherein the HotSpot 2.0-related policy information comprises policy information related to a roaming consortium concluded between Access Point (AP) service providers; and transmitting a policy information request message including the received HotSpot 2.0-related policy information, to a 3GPP-based network node in order to obtain 3GPP-based policy information into which the received HotSpot 2.0-related policy information has been reflected.

To achieve the objection, according to the one embodiment of the present specification, there is provided a method for obtaining policy information for traffic offload. The method may be performed by user equipment and comprise; receiving, by the user equipment, HotSpot 2.0-related policy information through an Access Point (AP), wherein the HotSpot 2.0-related policy information comprises identifier information of a roaming consortium concluded between Access Point (AP) service providers; checking whether an identifier of a roaming consortium in the received HotSpot 2.0-related policy information matches with a previously-set identifier of a roaming consortium; and if the identifier of the roaming consortium in the received policy information matches with the previously-set identifier of the roaming consortium, transmitting a policy information request message including the received HotSpot 2.0-related policy information, to a 3GPP-based network node in order to obtain 3GPP-based policy information into which the received HotSpot 2.0-related policy information has been reflected.

The policy information request message may comprise information about a HotSpot 2.0 capability of the user equipment.

The information about the HotSpot 2.0 capability comprises information about whether the HotSpot 2.0 capability is supported and information about whether the HotSpot 2.0 capability has been activated.

The policy information request message comprises information about types of venues where Access Points (AP) are installed and information about network types of the APs.

The network node may comprise an Access Network Discovery and Selection Function (ANDSF) node.

The method may further comprise checking whether the user equipment supports a HotSpot 2.0 capability.

To achieve the objection, according to the one embodiment of the present specification, there is provided a user equipment for obtaining policy information for traffic offload. The user equipment may comprise: a transceiver configured to receive HotSpot 2.0-related policy information through an Access Point (AP), wherein the HotSpot 2.0-related policy information comprises identifier information of a roaming consortium concluded between Access Point (AP) service providers; and a control unit configured to control the transceiver to transmit a policy information request message including the received HotSpot 2.0-related policy information, to a 3GPP-based network node in order to obtain 3GPP-based policy information into which the received HotSpot 2.0-related policy information has been reflected.

In accordance with this specification, the traffic of UE can be offloaded more effectively and rapidly by integrating service provider policies in an environment in which a plurality of service provider policies is present.

DESCRIPTION OF EXEMPLARY EMBODIMENTS

Figure 1:
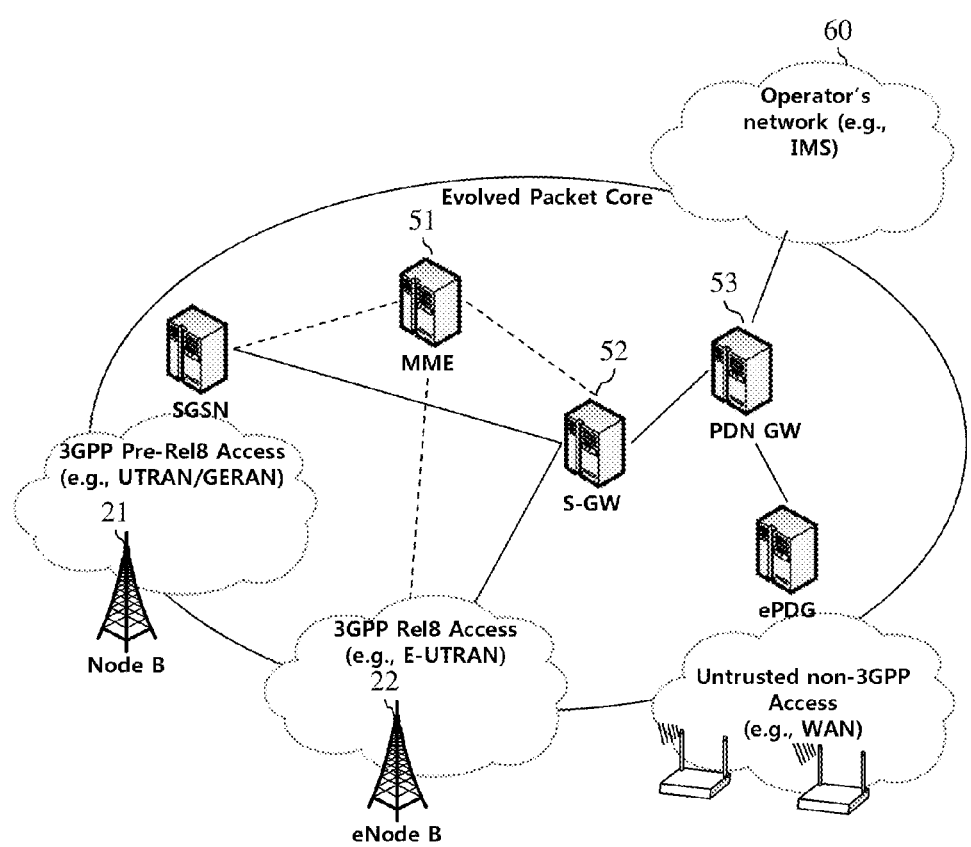
FIG. 1 illustrates the configuration of an evolved mobile communication network.
Figure 2:
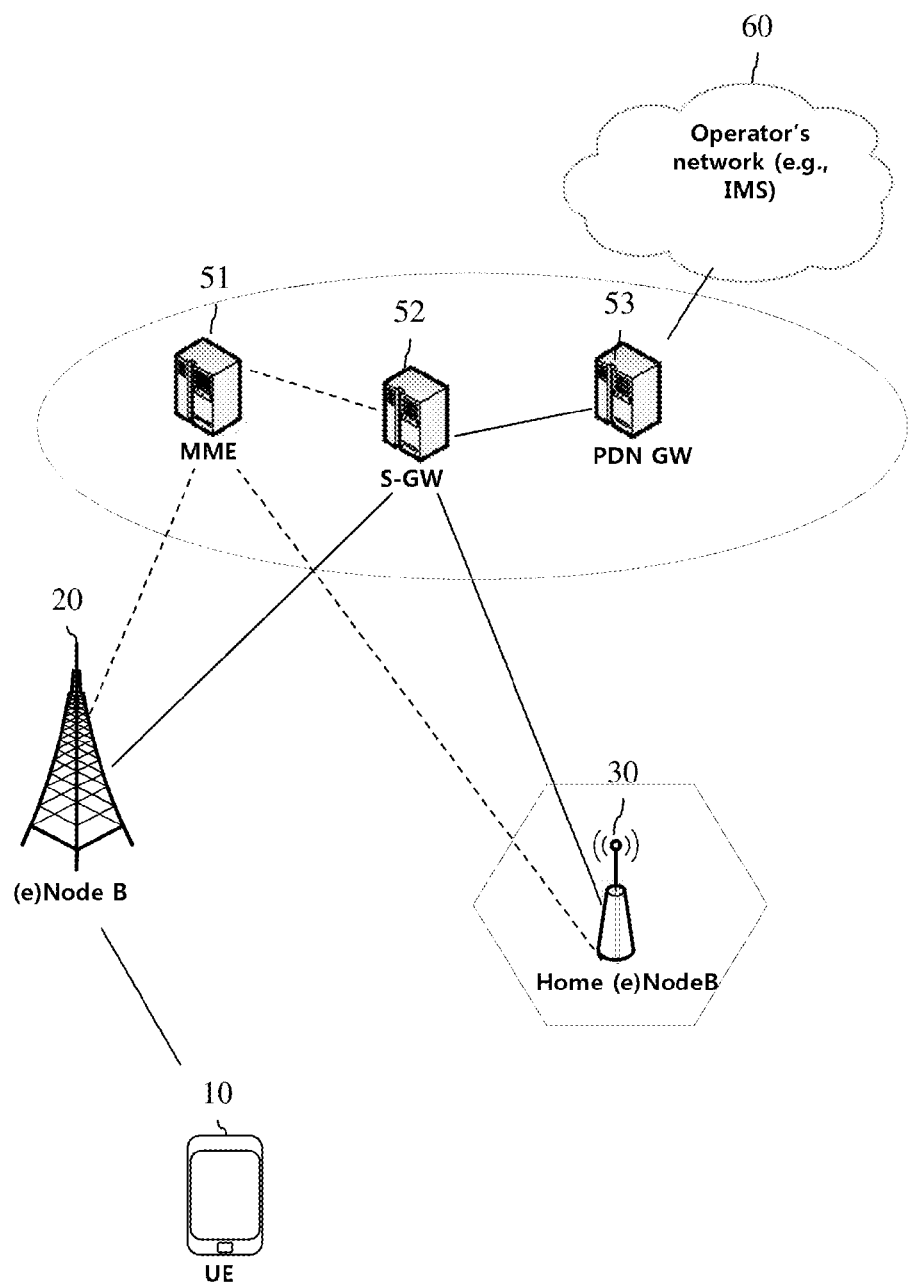
FIG. 2 is a diagram illustrating a relationship between an (e)NodeB and a Home (e)NodeB.
Figure 3:
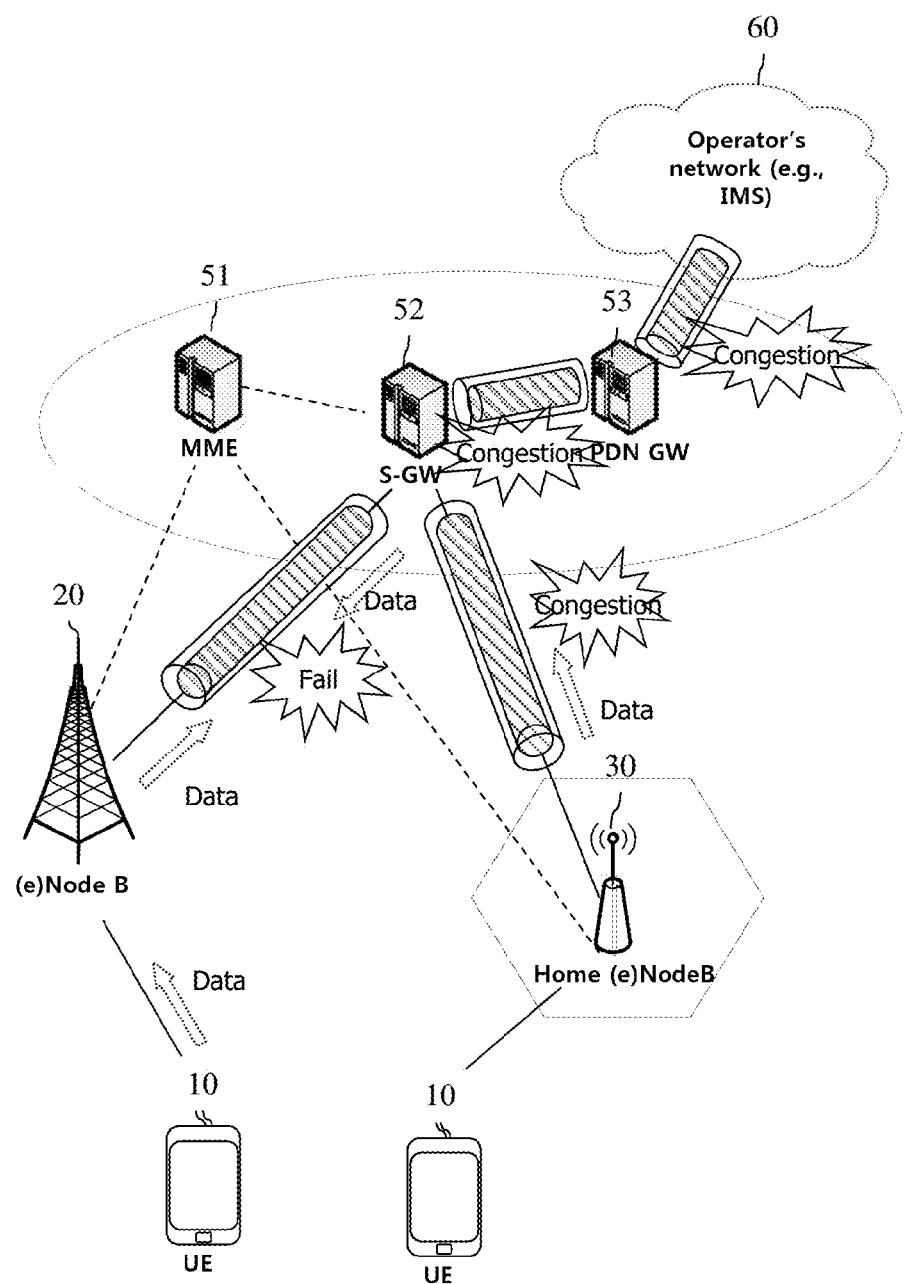
FIG. 3 illustrates conventional problems.
Figure 4:
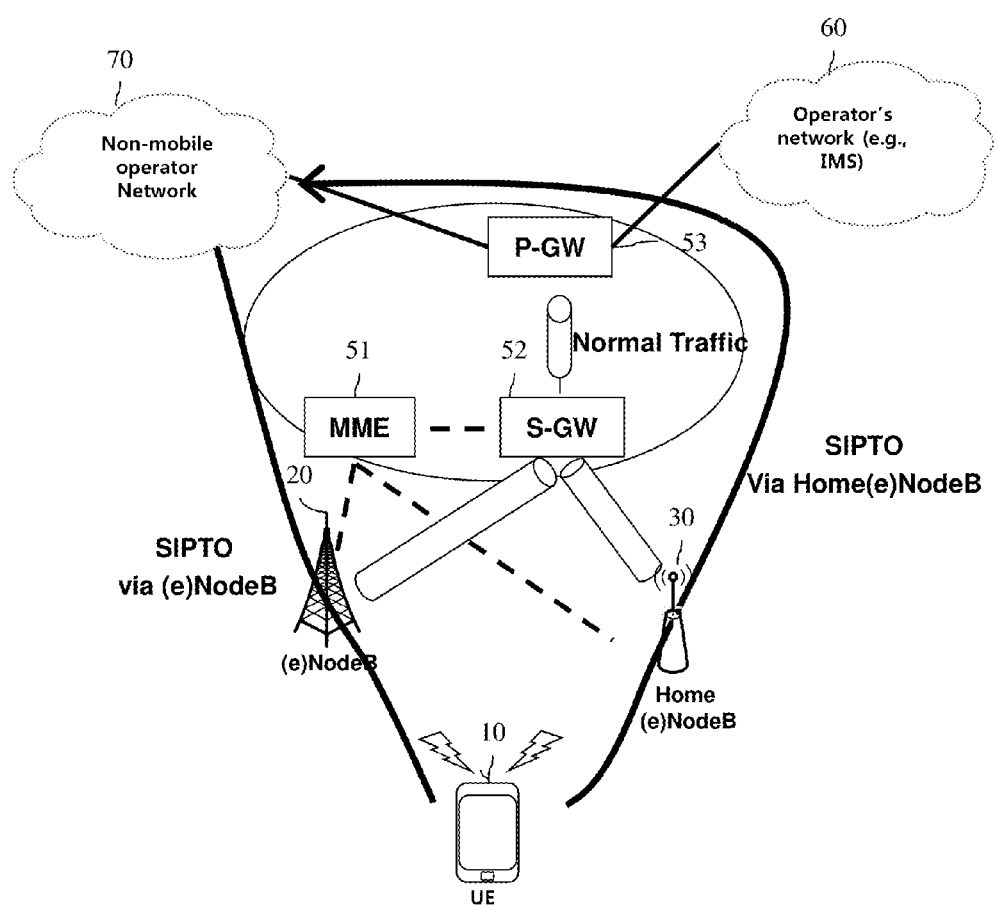
FIG. 4 illustrates a concept of Selected IP Traffic Offload (SIPTO).

The present invention is described based on a Universal Mobile Telecommunication System (UMTS) and an Evolved Packet Core (EPC), but the present invention is not limited to only such communication systems and may also be applied to all the communication systems and methods to which the technical spirit of the present invention may be applied.

It is to be noted that technical terms used in this specification are used to describe only specific embodiments and are not intended to limit the present invention. Furthermore, the technical terms used in this specification should be interpreted as having meanings that are commonly understood by those skilled in the art to which the present invention pertains, unless especially defined as other meanings in this specification, and should not be interpreted as having excessively comprehensive meanings or excessively reduced meanings. Furthermore, if the technical terms used in this specification are erroneous technical terms that do not precisely represent the spirit of the present invention, they should be replaced with and understood as technical terms that may be correctly understood by those skilled in the art. Furthermore, common terms used in the present invention should be interpreted according to the definition of dictionaries or according to the context and should not be interpreted as having excessively reduced meanings.

Furthermore, an expression of the singular number used in this specification includes an expression of the plural number unless clearly defined otherwise in the context. In this application, terms, such as "comprise" and "include", should not be interpreted as essentially including all several elements or several steps described in the specification and should be interpreted as not including some of the elements or steps or as including additional element or steps.

Furthermore, terms including ordinal numbers, such as the first and the second used in this specification, may be used to describe a variety of elements, but the elements should not be limited by the terms. The terms are used to only distinguish one element from the other element. For example, a first element may be named a second element and likewise a second element may be named a first element without departing from the scope of the present invention.

When one element is described as being "connected" or "coupled" with the other element, it should be understood that one element may be directly connected or coupled with the other element, but a third element may be interposed between the two elements. In contrast, when one element is described as being "directly connected" or "directly coupled" with the other element, it should be understood that a third element is not interposed between the two elements.

Hereinafter, preferred embodiments according to the present invention are described in detail with reference to the accompanying drawings. The same or similar elements are assigned the same reference numerals irrespective of their reference numerals, and redundant descriptions thereof are omitted. Furthermore, in describing the present invention, detailed descriptions of the known functions and constructions will be omitted if they are deemed to make the gist of the present invention unnecessarily vague. Furthermore, the accompanying drawings are provided to help easily understand the spirit of the present invention, and it is to be noted that the spirit of the present invention should not be interpreted as being limited by the accompanying drawings. The spirit of the present invention should be interpreted as being extended up to all changes, equivalents, and substitutes in addition to the accompanying drawings.

In the accompanying drawings, User Equipment (UE) is illustrated as an example, but the illustrated UE may also be referred to as a terminal, Mobile Equipment (ME) or the like. Furthermore, the UE may be a portable device, such as a laptop computer, a mobile phone, a PDA, a smart phone, or a multimedia device, or may be a device that cannot be carried, such as a PC or a device mounted on a vehicle.

DEFINITION OF TERMS

Prior to a description given with reference to the drawings, terms used in this specification are defined in brief in order to help understanding of the present invention.

UMTS: An abbreviation of a Universal Mobile Telecommunication System, which means a $3^{rd}$ mobile communication network.

EPS: An abbreviation of an Evolved Packet System and means a core network supporting a Long Term Evolution (LTE) network. The EPS is a network form evolved from the UMTS.

Public Data Network (PDN): An independent network in which a server that provides service is placed.

Access Point Name (APN): The name of an access point managed by a network, which is provided to UE. That is, the APN indicates the name (character string) of a PDN. A corresponding PDN for transmitting and receiving data is determined based on the name of the access point.

Access control: A control procedure for permitting whether or not to allow UE to use an access system, such as a Home(e)NodeB, or moving UE to another access system.

Tunnel Endpoint Identifier (TEID): the endpoint ID of a tunnel set between nodes within a network. The TEID is set in each section in a bearer unit of each piece of UE.

NodeB: A base station of an UMTS network, which is installed outdoors. The NodeB has cell coverage corresponding to that of a macro cell.

eNodeB: A base station of an Evolved Packet System (EPS), which is installed outdoors. The eNodeB has cell coverage corresponding to that of a macro cell.

(e)NodeB: A term that denotes a NodeB and an eNodeB.

Home NodeB: A base station of an UMTS network, which is installed indoors. The Home NodeB has cell coverage corresponding to that of a femto cell.

Home eNodeB: A base station of an EPS network, which is installed indoors. The Home eNodeB has cell coverage corresponding to that of a femto cell.

Home (e)NodeB: A term that denotes a Home NodeB and a Home eNodeB.

Home (e)NodeB gateway: a gateway that is connected with one or more Home (e)NodeBs and functions to interface with a core network.

Home (e)NodeB Subsystem: A form in which a wireless network is managed by grouping a Home (e)NodeB and a Home (e)NodeB gateway as one set. The Home (e)NodeB subsystem and the Home (e)NodeB may be considered to be a single set form because they manage a wireless network and function to operate in conjunction with a core network. Accordingly, hereinafter, terms: the Home (e)NodeB and the Home (e)NodeB subsystem are interchangeably used.

MME: An abbreviation of a Mobility Management Entity, which functions to control each entity within an EPS in order to provide a session and mobility to UE.

Closed Subscriber Group (CSG): A group of one or more Home (e)NodeBs. Home (e)NodeBs belonging to a CSG have the same CSG ID. Each user receives a use grant according to each CSG.

Closed access mode: It means that a Home (e)NodeB operates as a CSG cell. Closed access mode means that access is permitted for only UE allowed to a corresponding cell. That is, only UE having a right to specific CSG IDs supported by a Home (e)NodeB may access the Home (e)NodeB.

Open access mode: It means that a Home (e)NodeB operates like a normal cell (or non-CSG cell) without a concept of a CSG. That is, open access mode means that a Home (e)NodeB operates likes a normal (e)NodeB.

Hybrid access mode: It means that a Home (e)NodeB operates as a CSG cell and allows even a non-CSG subscriber to access to the Home (e)NodeB. Access is permitted for UE having a specific CSG ID that may be supported for a corresponding cell, Home (e)NodeB service may be provided to the UE, and access is permitted for even UE not having a CSG right.

Selected IP Traffic Offload (SIPTO): A technology in which when UE sends specific IP traffic through a Home(e)NodeB or an (e)NodeB, the specific IP traffic is offloaded to a wired network, such as the Internet, not to a network (e.g., 3GPP or 3GPP2) of a mobile communication service provider SIPTO femto (or femto SIPTO): A technology in which when UE sends specific IP traffic through a Home(e)NodeB, the specific IP traffic is offloaded to a wired network, such as the Internet, not to a network (e.g., 3GPP or 3GPP2) of a mobile communication service provider SIPTO macro (or macro SIPTO): A technology in which when UE sends specific IP traffic through an (e)NodeB, the specific IP traffic is offloaded to a wired network, such as the Internet, not to a network (e.g., 3GPP or 3GPP2) of a mobile communication service provider Local IP Access (LIPA): A technology in which a Home (e)NodeB is connected with a local network (i.e., a small-size network, for example, a home network or a company network) and UE within the Home(e)NodeB is allowed to access the local network through the Home(e)NodeB.

Local gateway: A gateway for enabling LIPA or SIPTO through the Home(e)NodeB, that is, a gateway that enables data to be directly transmitted over a home network or wired network without passing through a core network. The local gateway is placed between the Home(e)NodeB and the wired network, a bearer is generated between the Home(e)NodeB and the wired network or a bearer is generated between the Home (e)NodeB and a local network, and data is transmitted through the generated bearer.

Session: A session is a passage for data transmission, and the unit of a session may be a PDN, a bearer, or an IP flow. A difference between units, as defined in 3GPP, may be divided into the entire target network unit (APN or PDN unit), a unit classified according to QoS (i.e., a bearer unit) within the target network unit, and a target IP address unit.

PDN connection: Connection from UE to a PDN, that is, association (connection) between UE represented by an IP address and a PDN represented by an APN. PDN connection means connection (UE-PDN GW) between entities within a core network so that a session may be formed.

UE Context: Information about the situation of UE used to manage the UE in a network, that is, situation information including a UE ID, mobility (a current location, etc.), and the attributes (QoS, priority, etc.) of a session Local PDN: An individual independent network, such as a home network or a company network, not an external PDN Local Home(e)NodeB network: It means a network for access to a local PDN and includes a Home(e)NodeB and an L-GW.

Local network: A network including a local Home (e)NodeB network and a local PDN.

Brief descriptions of technologies proposed in this specification

Meanwhile, technologies proposed in this specification are described in brief below.

The present invention proposes a technology in which the data of UE is offloaded to a wired network without passing through the core network of a service provider in a mobile communication system based on a 3GPP Universal Mobile Telecommunication System (UMTS)/Evolved Packet System (EPS). Furthermore, there are proposed technologies, such as IFOM and MAPCON for supporting multiple radio access. That is, there are proposed a technology (MAPCON) in which data is transmitted through PDN connections for 3GPP access and Wi-Fi access and a technology in which 3GPP access and Wi-Fi access are grouped into a single PDN or P-GW and data is transmitted.

Furthermore, control over such operations is performed through a core network, a base station, UE or the like.

In this specification, in such technologies, the data of a user is not offloaded to a random network, but a radio access network is selected by taking the type of service, the location of a server, the type of transmitted data, etc. into consideration, and the data of a user is selectively offloaded.

Figure 5:
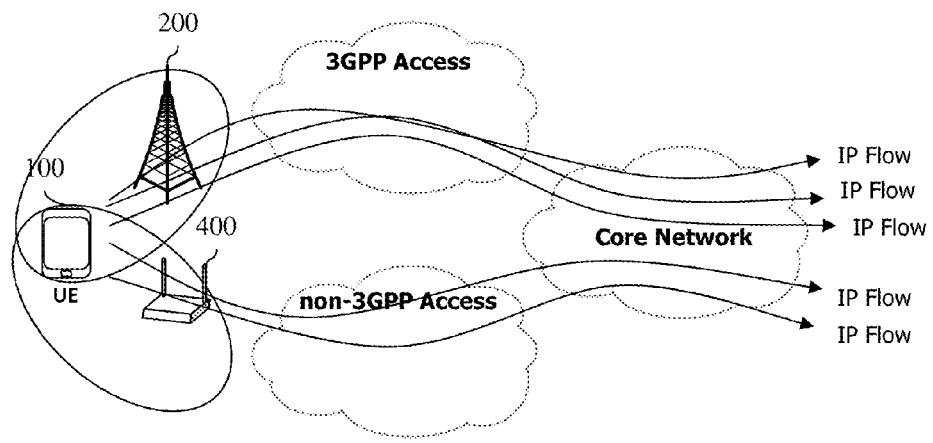
FIG. 5 is an exemplary diagram illustrating an example of an IFOM technology.

FIG. 5 is an exemplary diagram illustrating an example of the IFOM technology.

With an explosive increase of data, 3G mobile communication currently has reached its critical point. To this end, Long Term Evolution (LTE) is a good alternative.

Accordingly, to offload the data of a user through Wi-Fi in order to reduce the congestion of the core network of a mobile communication service provider is the best method capable of improving the profits of a service provider because it is possible at low costs.

Referring to FIG. 5, in IFOM, the same PDN connection is provided through other several pieces of access. Such IFOM provides offload to a seamless WLAN.

Furthermore, IFOM provides the transfer of the IP flows of the same one PDN connection from one type of access to another type of access.

Figure 6:
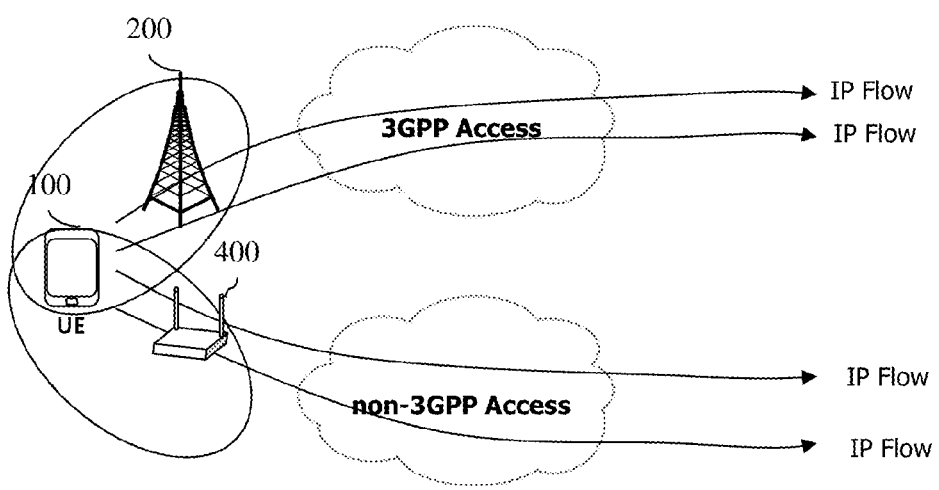
FIG. 6 is an exemplary diagram illustrating an example of a MAPCON technology.

FIG. 6 is an exemplary diagram illustrating an example of the MAPCON technology.

As may be seen with reference to FIG. 6, in the MAPCON technology, several PDN connections, easily, IP flows illustrated in FIG. 6 are connected with other APNs through another access system.

In accordance with such a MAPCON technology, UE 100 may generate a new PDN connection on access that has not been used. Alternatively, the UE 100 may generate a new PDN connection in access selected from several types of access that have been previously used. Alternatively, the UE 100 may transfer some of or all the PDN connections, already connected thereto, to another access.

Meanwhile, a service provider may control routing for PDN connections that are activated in several types of available access.

Figure 7:
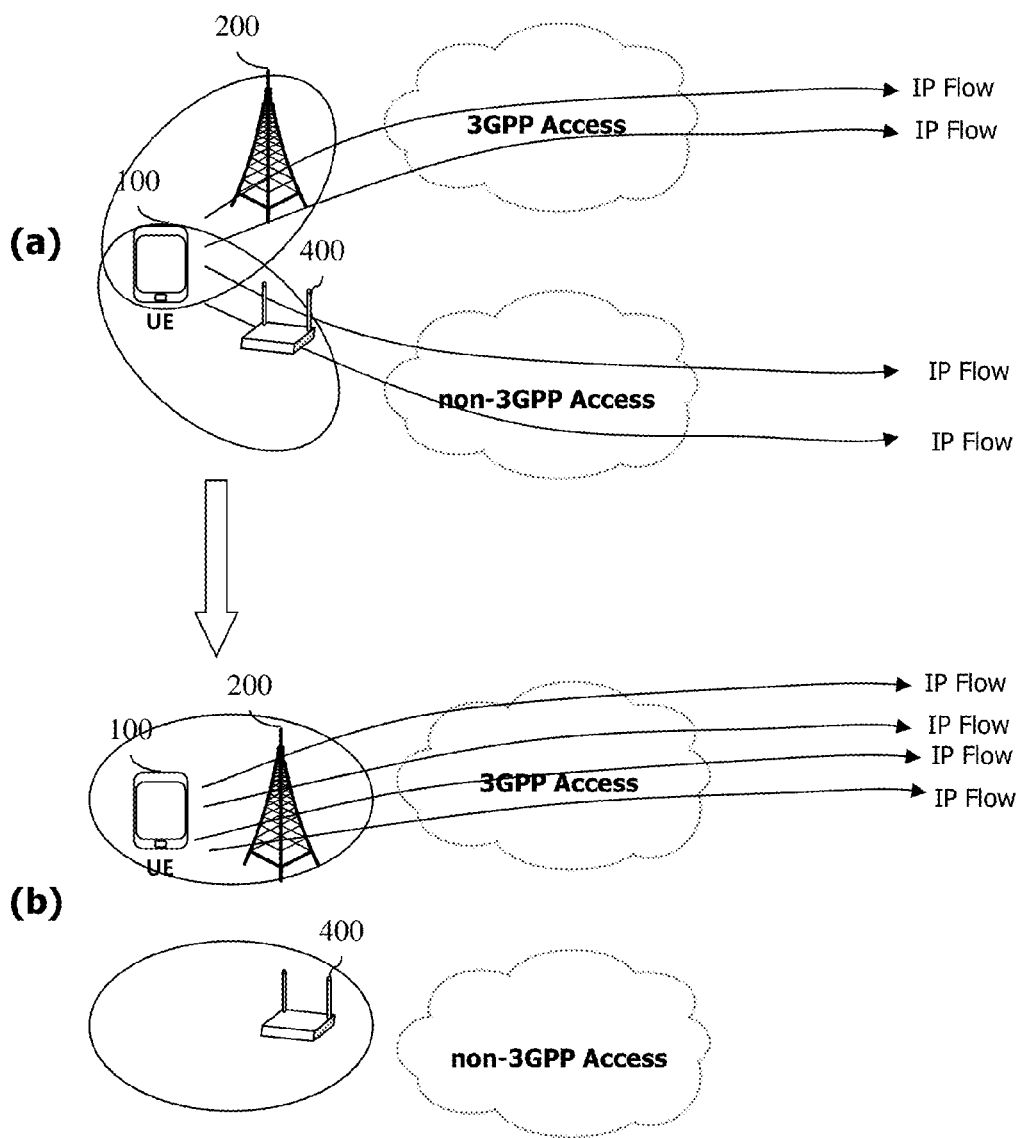
FIG. 7 illustrates examples of IP flows according to the MAPCON technology.
Figure 8:
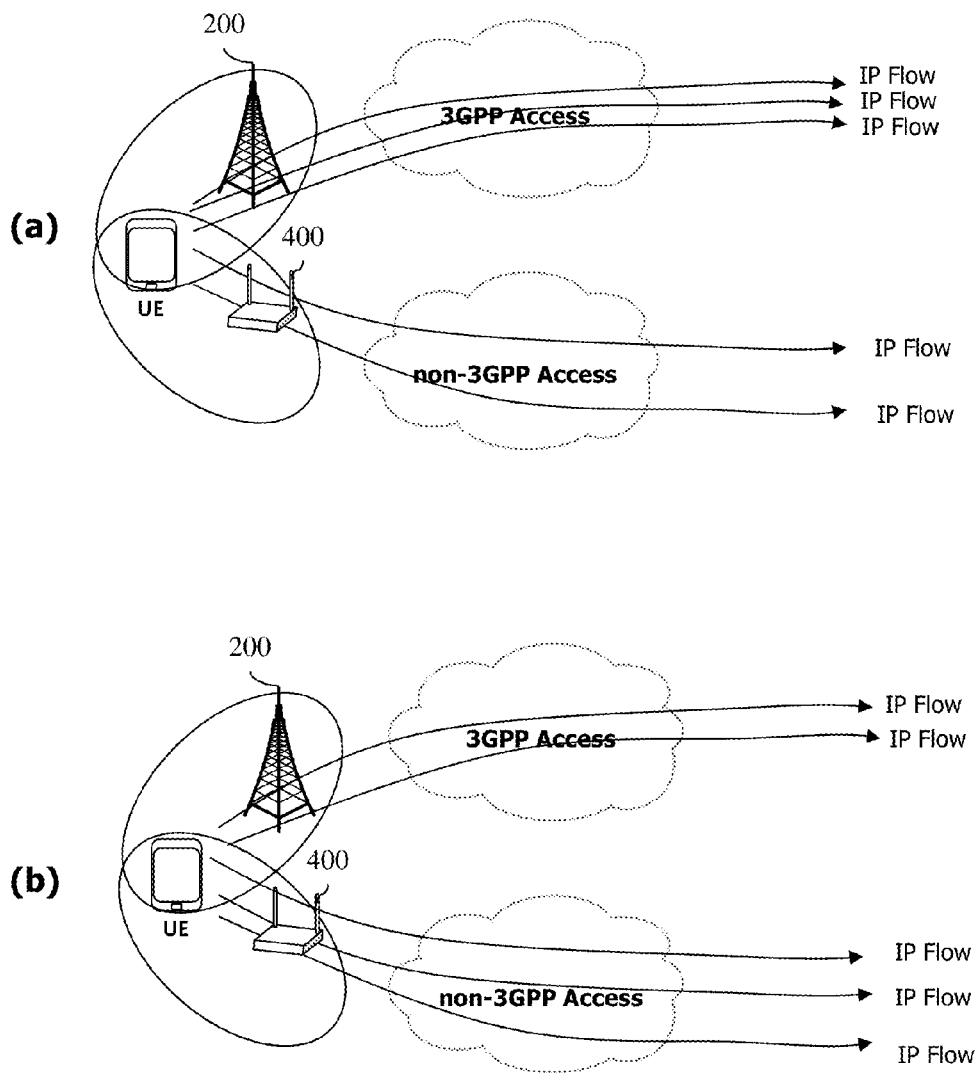
FIG. 8 illustrates other examples of IP flows according to the MAPCON technology.

FIG. 7 illustrates examples of IP flows according to the MAPCON technology, and FIG. 8 illustrates other examples of IP flows according to the MAPCON technology.

As may be seen with reference to FIG. 7(*a*), when UE 100 belongs to a base station, for example, both the coverage of an (e)NodeB 200 and the coverage of an AP 400, the UE 100 may transfer some of several PDN connections, for example, IP flows through 3GPP access using the base station, for example, the (e)NodeB 200 and may transfer the remaining IP flows through non-3GPP access using the AP 400.

For example, the UE 100 may transfer a connection for a voice call that requires a real-time property or a connection for data that requires reliability through 3GPP access using the base station, for example, the (e)NodeB 200 and may transfer a connection for video data that does not require a real-time property or a connection for normal data that does not require reliability through non-3GPP access using the AP 400.

Meanwhile, if the UE 100 deviates from the coverage of the AP 400 as illustrated in FIG. 7(*b*), a connection through non-3GPP access using the AP 400 may be changed so that it passes through 3GPP access using the base station, for example, the (e)NodeB 200.

Meanwhile, as may be seen with reference to FIG. 8(*a*), the UE 100 may transfer a connection for specific data through 3GPP access using a base station, for example, an (e)NodeB 200 and may transfer a connection for other data through non-3GPP access using the AP 400.

As may be seen with reference to FIG. 8(*b*), the UE 100 may change some connections through 3GPP access using a base station, for example, the (e)NodeB 200 so that the some connections pass through non-3GPP access using the AP 400. That is, the UE may transfer the connections.

Figure 9:
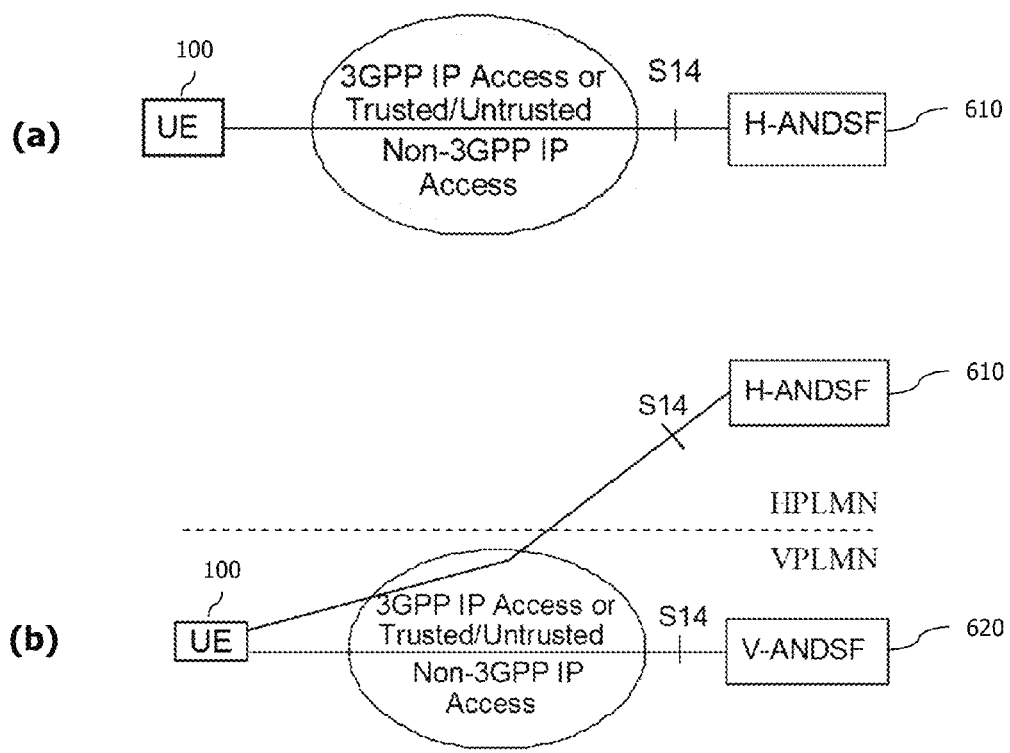
FIG. 9 illustrates a network control entity for selecting an access network.

FIG. 9 illustrates a network control entity for selecting an access network.

As may be seen with reference to FIG. 9(*a*), a network control entity for providing IFOM or MAPCON, that is, an Access Network Discovery and Selection Function (ANDSF), may be present in the Home PLMN (hereinafter referred to as an 'HPLMN') of UE 100.

The ANDSF performs a network discovery function and a data management and control function for providing selective assistance data according to a service provider policy.

The ANDSF may respond to a request from UE regarding access network discovery information and may also send information, if needed, although there is no request from UE.

The ANDSF may provide information about the inter-system mobility policy, information for access network discovery, and information about inter-system routing, for example, a routing rule.

The information about routing, for example, the routing rule may include AccessTechnology, AccessId, AccessNetworkPriority, and so on.

The technology 'ANDSF' has started as a technology for providing a policy for a movement between heterogeneous networks. Today, in this technology, if several types of radio access are possible, preference may be determined, radio access may be selected based on the determined preference, and data may be transmitted.

The ANDSF may provide the inter-system mobility policy, access network discovery information, and an inter-system routing policy as follows.

1) An Inter-System Mobility Policy:

The inter-system mobility policy is a set of service provider definition rules and configurations that will influence the determination of an inter-system mobility that has been made by UE. When UE routes routing IP traffic through a single wireless access interface at a given time (e.g., when IFOM is impossible or an IFOM function is deactivate), the UE may use the inter-system mobility policy for the following purposes. That is, the inter-system mobility policy may be used (i) to determine whether inter-system mobility is permitted or limited or (ii) to select the most preferred access technology type or access network to be used to access an EPC.

For example, the inter-system mobility policy may indicate that handover is not permitted between systems from WLAN access to E-UTRAN access. Furthermore, for example, the inter-system mobility policy may indicate that WiMax access is preferred over WLAN access.

The inter-system mobility policy may be provided to UE and may be updated based on a network trigger or may be updated after a request from UE regarding network discovery and selection information is received.

The inter-system mobility policy may indicate that which access network and which access technology type are chiefly preferred for EPC access. Furthermore, the inter-system mobility policy may indicate whether mobility between systems is permitted or limited.

Furthermore, when an access network is automatically selected, the inter-system mobility policy may indicate whether an access network for EPC access or the service provider preference list of an access technology type is preferred over the preference list of a corresponding user.

2) Access Network Discovery Information:

When receiving a request from UE, the ANDSF may provide a list of access networks that belongs to all the access technology types and that are available in an area where the UE is placed.

The ANDSF may provide UE with information about available access networks. In this case, the information may include an access technology type and a wireless access network identifier.

UE may maintain and use access network discovery information provided by the ANDSF until it obtains new or updated information.

3) An Inter-System Routing Policy:

The ANDSF may simultaneously route IP traffic through several wireless access interfaces. UE may use the inter-system routing policy in order to satisfy the routing or offload reference items of a service provider when it is able to simultaneously route IP traffic through multiple wireless access interfaces. For example, the UE may use the inter-system routing policy when determining that an access technology type or an access network is limited with respect to a specific IP traffic flow and when. Alternatively, the UE may use the inter-system routing policy by selecting the most preferred access technology or access network to be used by the UE when it is able to route IP traffic that satisfies specific conditions.

The inter-system routing policy may be provided to UE, may be updated based on a network trigger, or may be updated by the ANDSF after a request regarding network discovery and selection information is received from UE.

The inter-system routing policy may include an effective condition in which a provided policy is effective until when, one or more filter rules for IFOM, one or more filter rules for MAPCON, one or more filter rules for WLAN offload, and so on.

In the case of IFOM, traffic may be identified based on each filter rule destination/source address, transport protocol, destination/source port number, DSCP or traffic class, target domain name, and application program ID of non-smooth WLAN offload.

For example, the ANDSF may obtain a permanent UE ID depending on a configuration of a service provider.

As described above, the information provided by the ANDSF may include the three types of information, such as the inter-system mobility policy, the access network discovery information, and the inter-system routing policy.

Meanwhile, as may be seen with reference to FIG. 9(b), the network control entity for providing IFOM or MAPCON, that is, the ANDSF, may be present in the home PLMN (hereinafter referred to as an 'HPLMN') of the UE 100 or may be present in a visited PLMN (hereinafter referred to as a 'VPLMN').

An H-ANDSF 610 may select an inter-system mobility policy, access network discovery information, and an inter-system routing policy, delivered to the UE, depending on communication requirements and a roaming contract. If a permanent UE ID is known to the H-ANDSF, subscriber data may be provided to the H-ANDSF depending on a configuration of a service provider in order to select the inter-system mobility policy, the access network discovery information, and the inter-system routing policy.

Likewise, a V-ANDSF 620 may select an inter-system mobility policy, access network discovery information, and an inter-system routing policy, delivered to the UE, depending on communication requirements and a roaming contract.

If UE has access network discovery information, an inter-system mobility policy, or an inter-system routing policy and the information or policy indicates that an access network having higher priority than a current selected access network, is present around a current location, the UE may discover and select the access network having higher priority as long as the access network is permitted by user configurations.

UE incapable of simultaneously routing IP traffic on several wireless access interfaces may select an available access network having the highest preference for inter-system mobility based on a received inter-system mobility policy and user preference. If an access network is automatically selected, UE should not access an EPC using an access network that is indicated to be limited by an inter-system mobility policy.

However, UE capable of simultaneously routing IP traffic on several wireless access interfaces may receive both an inter-system mobility policy and an inter-system routing policy from the ANDSF. If UE has an IFOM function, a MAPCON function, and a deactivated WLAN offload function, the UE may select an available access network having the highest preference based on a received inter-system mobility policy and user preference.

Figure 10:
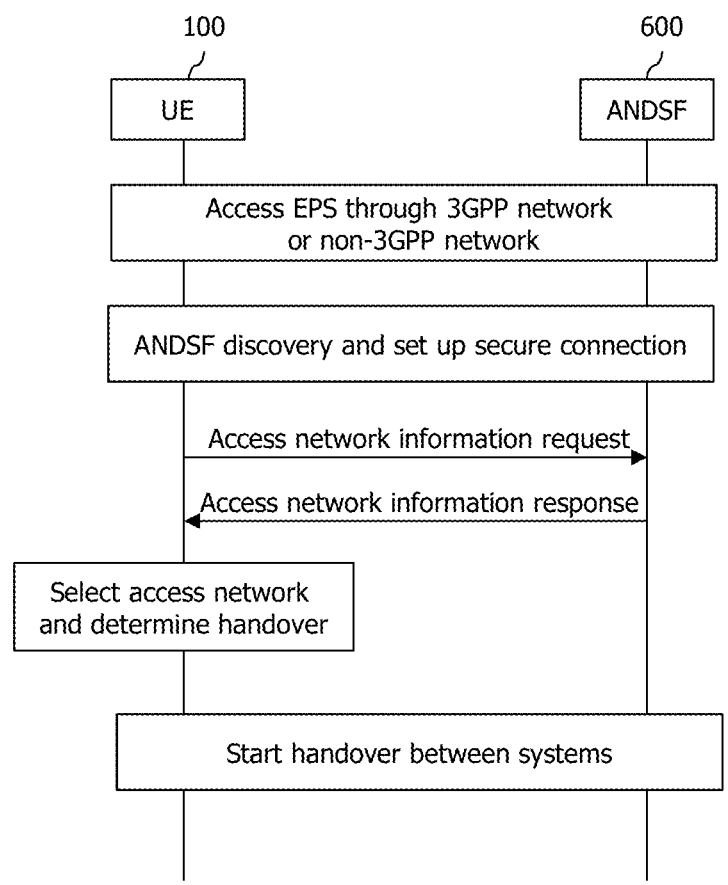
FIG. 10 illustrates a handover procedure between a 3GPP network and a non-3GPP network based on an ANDSF policy.

FIG. 10 illustrates a handover procedure between a 3GPP network and a non-3GPP network based on an ANDSF policy.

As may be seen with reference to FIG. 10, UE 100 is connected to a source access network (any one of 3GPP access or trusted or untrusted non-3GPP IP access). If the UE 100 is not connected to a specific access network, a wireless interface may be in saving mode or may be in a power source that has been turned off.

If an inter-system mobility policy indicates that at least one access technology type is permitted for inter-system mobility within the UE 100, the UE may determine to discover a neighboring access network through the support of the network. In such a case, the UE may obtain the address of an ANDSF 600 and set up secret communication with the ANDSF.

In order to obtain network discovery and selection information, the UE 100 sends an access network information request message to the ANDSF 600, for example, to an H-ANDSF or a V-ANDSF. The message may include a function of the UE and information about the location of the UE. The function of the UE may be indicative of a function of the UE related to access network discovery, such as an access technology type that may be supported by the UE. The information about the location of the UE may be included only when it is available. The information about the location of the UE may include a current location, for example, one or more of a cell ID, a TAI, and GPS information.

The ANDSF 600 sends an access network information response message. The response message may include, for example, available access network information and an updated inter-system mobility policy. The available access network information includes a list of access networks that may be used around the UE. If one or more access technology types are included in the request message transmitted by the UE 100, the response message may include the requested access technology type and information about neighboring access networks. The updated inter-system mobility policy may be included in order to update or install the service provider definition rules or environment configurations of the UE 100.

The UE 100 that has received the response message turns on a proper wireless interface and measures an access network to which inter-system mobility is indicated to be permitted by the inter-system mobility policy. The UE 100 selects the most preferred access network for inter-system mobility based on one or more of the inter-system mobility policy and the user configurations.

When the UE 100 selects the access network, it starts a handover procedure to the selected access network.

Figure 11:
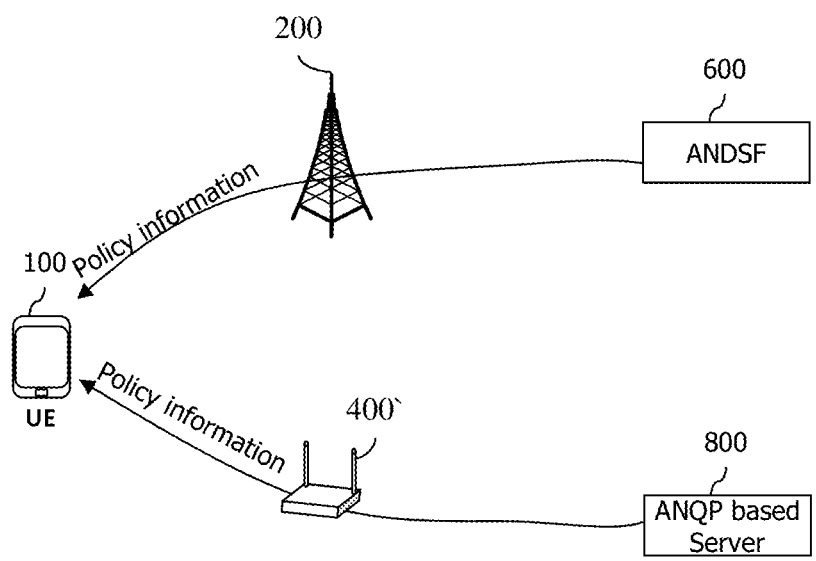
FIG. 11 illustrates a relationship between a HotSpot 2.0 AP that is recently under discussion and an ANDSF.

FIG. 11 illustrates a relationship between a HotSpot 2.0 AP that is recently under discussion and an ANDSF.

As may be seen with reference to FIG. 11, a HotSpot 2.0 AP 400' that is recently under discussion is illustrated.

An existing, traditional Hotspot meant that Wi-Fi service is provided to an unspecific number of the general public in many public places including a large floating population. As the use of bandwidths is explosively increased, however, it has become difficult to sufficiently provide a required bandwidth using the $3^{rd}$ generation or even $4^{th}$ generation mobile communication technology. In particular, in a business district that is densely populated in the daytime, it has become difficult to control bandwidths. In order to solve such a problem, HotSpot 2.0 has been researched in order to provide vertical handoff service by associating a mobile communication network in an overpopulated area with a Wi-Fi network.

Meanwhile, in HotSpot 2.0, a roaming consortium between several service providers is possible.

The roaming consortium is a group of service providers between which a roaming convention has been concluded.

Numerous Service Set Identifiers (SSID) corresponding to the roaming consortium may be present according to the roaming consortium. 3GPP service providers who cooperate with the roaming consortium may be unaware of all the numerous SSIDs. Furthermore, an AP according to recently developed IEEE 802.0 may provide a realm or Organizational Unique Identifier (OUI) in addition to the SSIDs. Accordingly, all of such situations make it very difficult for a service provider to manage all the SSIDs.

In order to solve such a problem, in HotSpot 2.0, a server 800 provides a policy related to a roaming consortium through an Access Network Query Protocol (ANQP).

Furthermore, the ANQP-based server 800 provides information about an access network type, such as whether the Hotspot AP 400' is for a private use, for a public use, free, or personal, and so on. Furthermore, the ANQP-based server 800 may provide place type information about whether a place where the Hotspot AP 400' is installed is, for example, a school, a hospital, a hotel, an office, a home, etc.

The ANQP-based server 800 may formulate a different policy depending on the Hotspot AP 400' based on such information. For example, the ANQP-based server 800 may divide information into a private use, a public use, and so on based on the SSID of the Hotspot AP 400' and provide a policy having different QoS. Furthermore, the ANQP-based server 800 may provide a policy different depending on a roaming consortium.

As described above the ANQP-based server 800 may provide a policy, and so on according to a roaming consortium.

In this case, a policy provided from the ANQP-based server 800 to the UE 100 may be different from a policy provided from the ANDSF 600 to the UE 100.

For example, a policy provided from the ANDSF 600 to common UE 100 may indicate that an AP having an SSID of 'my operator' has the highest priority. In contrast, a policy provided from the ANQP-based server 800 to the UE 100 may indicate that an AP having an SSID of 'other operator' has the highest priority.

As described above, there is a problem in that several policies may be mixed.

Figure 12:
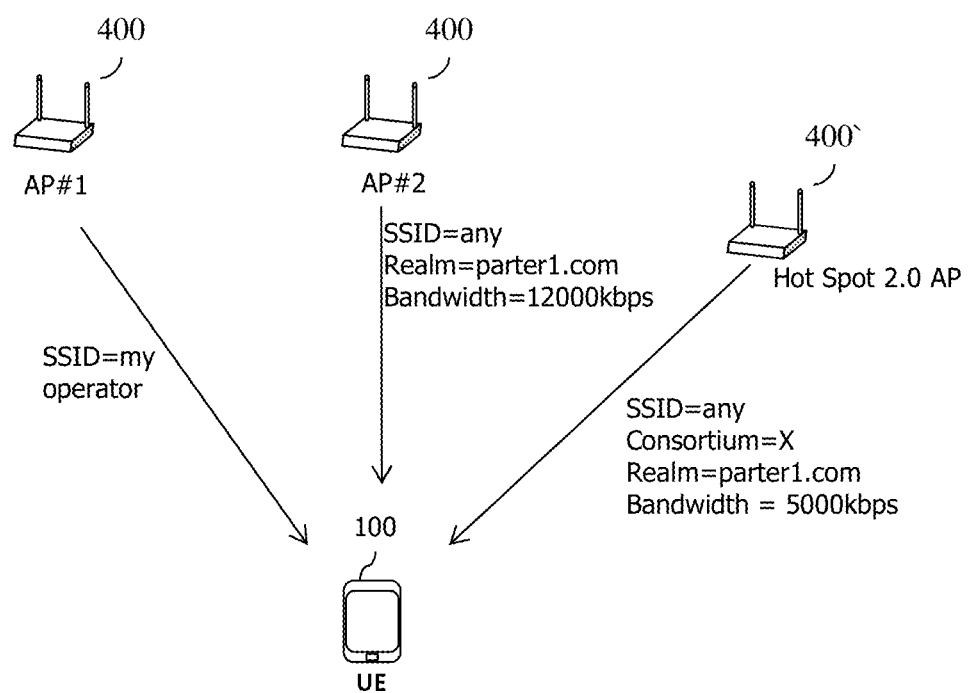
FIG. 12 is an exemplary diagram illustrating an overlap problem between several policies.

FIG. 12 is an exemplary diagram illustrating an overlap problem between several policies.

Referring to FIG. 12, UE 100 has been illustrated as being located within the coverage of an AP#1 400, an AP#2 400, and a HotSpot 2.0 AP 400'.

In this case, the AP#1 400 sends a beacon message including an SSID of 'my operator'. The AP#2 400 sends a beacon message, including an SSID 'any', a realm 'parter1.com', and bandwidth information. The HotSpot 2.0 AP 400' sends a beacon message, including an SSID 'any', a roaming consortium identifier 'X', a realm 'parter1.com', and bandwidth information.

If the UE 100 has received a policy, indicating that the SSID 'my operator' is the highest priority, from the ANDSF 600 and owns the policy, however, the UE 100 may assign the top priority to the AP#1 400 and select the AP#1 400.

If the UE 100 receives another policy from an ANQP-based server 800 through the HotSpot 2.0 AP 400', the UE 100 may encounter a problem in which correct selection is impossible.

Furthermore, in general, the policy generated by the ANDSF 600 is a policy provided to the UE irrespective of a hotspot (HS) 2.0 capability or state of the UE. Accordingly, the aforementioned problems may be weighted.

Furthermore, from a viewpoint of a network, there may be a limit to flexibly providing the policy of a service provider by taking into consideration the state and environment of UE that is dynamically changed.

Accordingly, schemes capable of managing such several policies are described below.

Figure 13:
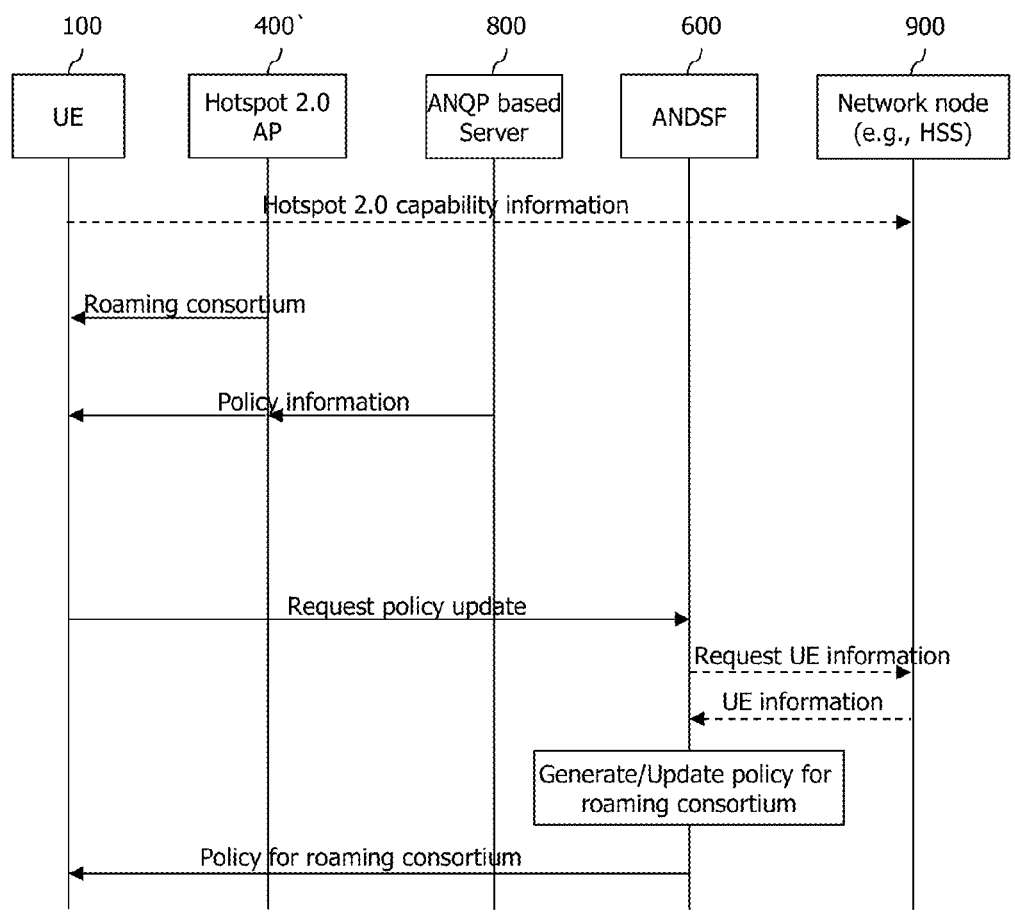
FIG. 13 is a flowchart illustrating a method according to an embodiment proposed by this specification.

FIG. 13 is a flowchart illustrating a method according to an embodiment proposed by this specification.

As may be seen with reference to FIG. 13, the UE 100 may selectively send information about a HotSpot 2.0 capability to a network node 900.

The information about the HotSpot 2.0 capability may include information about whether the UE 100 has the HotSpot 2.0 capability and whether the HotSpot 2.0 capability has now been activated or deactivated if the UE 100 has the HotSpot 2.0 capability.

The information may be transferred at point of time at which control information is transferred like an attach point of time, a Tracking Area Update (TAU) point of time, and an AAA certification point of time.

The network node may be, for example, a Home Subscriber Sever (HSS) MME, an AAA server, or a PCRF. Alternatively, the network node may be a dedicated node for managing information about the HotSpot 2.0 capability.

In FIG. 13, the information about the HotSpot 2.0 capability has been illustrated as being transferred without a request from the network node 900, but the information may be transferred when the request is made.

Alternatively, the information about the HotSpot 2.0 capability may be previously stored in the network node. In such a case, unlike in FIG. 13, the UE 100 may not transfer the information. In this case, only when the HotSpot 2.0 capability within the UE 100 is changed, such as that the HotSpot 2.0 capability is activated or deactivated, the information about the HotSpot 2.0 capability may be transferred in order to update information within the network node.

The UE 100 may receive roaming consortium information from the HotSpot 2.0 AP 400'. The roaming consortium information may be received along with pieces of information, such as an SSID and a realm, as described with reference to FIG. 12. In such a case, the pieces of information may be received through a beacon message.

Meanwhile, the UE 100 receives policy information from the ANQP-based server 800 via the HotSpot 2.0 AP 400'.

The policy information has been illustrated as being transferred without a request from the UE 100/HotSpot 2.0 AP 400', but may be transferred only when a request is made.

The policy information received from the ANQP-based server 800 may include one or more of a list of service providers having a roaming relationship, information about a venue type, information about an access network type (e.g., for a private use or for a public use), information about a name, and information about a group, for example.

When the policy information is received, the UE 100 checks whether it supports the HotSpot 2.0 capability. If the HotSpot 2.0 capability is found to be supported, the UE 100 checks whether the HotSpot 2.0 capability has been activated or deactivated.

If the HotSpot 2.0 capability is found to be not supported or the HotSpot 2.0 capability is found to be supported, but to have been deactivated, the UE 100 may neglect the policy information received from the ANQP-based server 800.

Thereafter, the UE 100 may selectively check or evaluate the policy information.

Such a check or evaluation may be performed based on information previously set in the UE 100 or information received from a specific node. For example, the check or evaluation may be performed based on one or more of information about the HotSpot 2.0 capability, information about a subscriber, information about a certification level, a certification mechanism, priority information according to a certification protocol, information about the location of the UE, and information about user configurations within the UE 100. During the check or evaluation, it is checked whether an identifier of a roaming consortium in the received policy information matches with a previously-set identifier of a roaming consortium.

The UE which has received the policy information from the ANQP based server 800 transmits a request message for requesting a policy to the ANDSF 600. Here, the transmission of the request message to the ANDSF 600 is performed when the identifier of the roaming consortium in the received policy information matches with the previously-set identifier of the roaming consortium.

The request message may be transferred through a common interface protocol with the ANDSF 600. Alternatively, the request message may be transferred using a procedure with a new interface protocol.

The information about the HotSpot 2.0 capability of the UE 100 may be selectively included in the request message. For example, if the UE 100 has not sent the information about the HotSpot 2.0 capability to the network node 900 in the above step, the information about the HotSpot 2.0 capability may be included in the request message. Alternatively, if the UE 100 has sent the information about the HotSpot 2.0 capability to the network node 900 in the above step, but the active/inactive state of the HotSpot 2.0 capability has been changed, the information about the HotSpot 2.0 capability may be included in the request message.

One or more of pieces of the information received from the HotSpot 2.0 AP 400' may be included in the request message.

Furthermore, information about the user configurations, information about the information, etc. may be included in the request message.

Meanwhile, when receiving the request message, the ANDSF 600 generates or updates an existing policy for a roaming consortium.

In this case, if information about the UE 100, for example, information about the HotSpot 2.0 capability or information about the user configurations is not included in the request message, the ANDSF 600 may obtain the information about the UE by sending a request message to the network node 900.

In order to generate or update the policy for the roaming consortium, the ANDSF 600 may use one or more of the information about the HotSpot 2.0 capability and the information about the user configurations of the UE 100. Furthermore, the ANDSF 600 may use the information about the location of the UE, information about service providers for selecting other networks, and so on.

While generating or updating the policy, the ANDSF 600 may coordinate priority between policies and arrange pieces of information so that the updated policy does not conflict with the policy of the ANQP-based server 800.

As described above, the policy information generated or updated by the ANDSF 600 may be illustrated as in FIG. 12, for example.

TABLE 1

Access Priority 1: WLAN, any SSID, a roaming consortium = "X", a minimum bandwidth = 1000 Kbps, time = xxx, . . .

TABLE 1-continued

Access Priority 2: WLAN, any SSID, a roaming consortium = "X", a minimum bandwidth = 1300 Kbps, time = yyyy, . . .

As may be seen from Table 1 above, the ANDSF 600 may generate the policy information by determining priority based on pieces of information about a HotSpot 2.0 capability, a roaming consortium, a bandwidth, an SSID, and so on.

Thereafter, the ANDSF 600 transfers the generated or updated policy information to the UE 100.

As described above, in FIG. 13, the policy information has been illustrated as being generated or updated by the ANDSF, but may be generated or updated by a separate different node.

In such a case, if the UE 100 has received policy information from the ANDSF 600 and also has received policy information from the ANQP-based server 800, the UE 100 may neglect the policy information from the ANDSF 600 and may request the separate different node to update the policy information received from the ANDSF 600. A message that requests the update may include information about the ID of the ANDSF 600.

Alternatively, although there is no update request from the UE 100, the separate different node may update the policy information generated by the ANDSF 600 and transfer the updated policy information to the UE 100. To this end, the separate different node may receive respective pieces of policy information from the ANQP-based server 800 and the ANDSF 600.

The aforementioned methods may be implemented using hardware. An implementation of the hardware is described with reference to FIG. 14.

Figure 14:
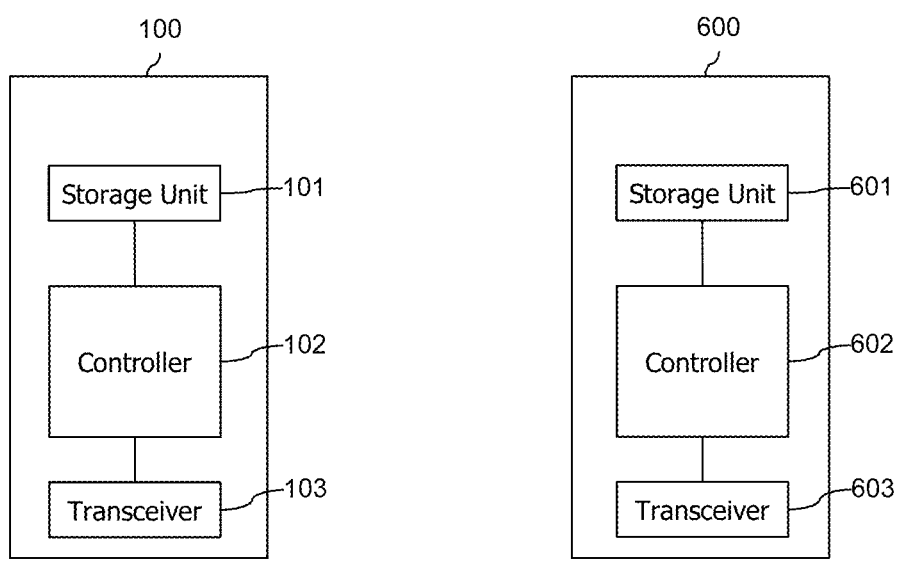
FIG. 14 is a block diagram illustrating the configurations of UE 100 and an ANDSF 600 according to the present invention.

FIG. 14 is a block diagram illustrating the configurations of the UE 100 and the ANDSF 600 according to the present invention.

As illustrated in FIG. 14, the UE 100 includes storage means 101, a controller 102, and a transceiver 103. Furthermore, the ANDSF 600 includes storage means 601, a controller 602, and a transceiver 603.

The storage means 101, 601 store the aforementioned methods.

The controllers 102, 112 control the storage means 101, 601 and the transceivers 103, 603. More specifically, the controllers 102, 602 execute the respective methods stored in the storage means 101, 601. Furthermore, the controllers 102, 602 send the aforementioned signals to through the transceivers 103, 603.

Although the preferred embodiments of the present invention have been illustratively described, the scope of the present invention is not limited to only the specific embodiments, and the present invention may be modified, changed, or improved in various forms within the spirit of the present invention and within a category written in the claims.

What is claimed is:

1. A method for obtaining policy information for traffic offload, the method performed by a user equipment and comprising:

receiving, by the user equipment, HotSpot 2.0-related policy information from an Access Network Query Protocol (ANQP)-based server through an Access Point (AP), wherein the HotSpot 2.0-related policy information comprises policy information related to a roaming consortium concluded between AP service providers;

transmitting a policy information request message including the received HotSpot 2.0-related policy information to an Access Network Discovery and Selection Function (ANDSF) node; and receiving Third Generation Partnership Project (3GPP)-based policy information from the ANDSF node, wherein the 3GPP-based policy information is generated by the ANDSF node to prevent a conflict with a policy of the Hotspot 2.0-related policy information.

2. The method of claim 1, wherein the policy information request message comprises information about a HotSpot 2.0 capability of the user equipment.

3. The method of claim 2, wherein the information about the HotSpot 2.0 capability comprises information about whether the HotSpot 2.0 capability is supported and information about whether the HotSpot 2.0 capability has been activated.

4. The method of claim 1, wherein the policy information request message comprises information about types of venues where APs are installed and information about network types of the APs.

5. The method of claim 1, further comprising:
checking whether the user equipment supports a HotSpot 2.0 capability.

6. The method of claim 5, wherein the transmitting step of the policy information request message to the ANDSF node is performed when the HotSpot 2.0 capability is supported and activated by the user equipment.

7. The method of claim 1, further comprising:
checking whether an identifier of a roaming consortium in the received HotSpot 2.0-related policy information matches with a previously-set identifier of the roaming consortium,
wherein the policy information request message is transmitted if the identifier of the roaming consortium in the received policy information matches with the previously-set identifier of the roaming consortium.

8. A user equipment for obtaining policy information for traffic offload, the user equipment comprising: a transceiver configured to receive HotSpot 2.0-related policy information from an Access Network Query Protocol (ANQP)-based server through an Access Point (AP), wherein the HotSpot 2.0-related policy information comprises identifier information of a roaming consortium concluded between AP service providers; and a controller configured to control the transceiver to transmit a policy information request message including the received HotSpot 2.0-related policy information to an Access Network Discovery and Selection Function (ANDSF) node, and receive Third Generation Partnership Project (3GPP)-based policy information from the ANDSF node, wherein the 3GPP-based policy information is generated by the ANDSF node to prevent a conflict with a policy of the Hotspot 2.0-related policy information.

9. The user equipment of claim 8, wherein the policy information request message comprises information about a HotSpot 2.0 capability of the user equipment.

10. The user equipment of claim 9, wherein the information about the HotSpot 2.0 capability comprises information about whether the HotSpot 2.0 capability is supported and information about whether the HotSpot 2.0 capability has been activated.

11. The user equipment of claim 8, wherein the policy information request message comprises information about types of venues where APs are installed and information about network types of the APs.

12. The user equipment of claim 8, wherein the controller is further configured to check whether the user equipment supports a HotSpot 2.0capability.

13. The user equipment of claim 12, wherein the controller transmits the policy information request message to the ANDSF node when the HotSpot 2.0 capability is supported and activated by the user equipment.

14. The user equipment of claim 8, wherein the control unit further configured to check whether an identifier of a roaming consortium in the received HotSpot 2.0-related policy information matches with a previously-set identifier of the roaming consortium, and
wherein the policy information request message is transmitted if the identifier of the roaming consortium in the received policy information matches with the previously-set identifier of the roaming consortium.

* * * * *